July 19, 1955 A. F. GALLISTEL 2,713,344
FLUSHING SYSTEM FOR VACUUM FLUID
LINES AND VALVE THEREFOR
Filed Aug. 11, 1954 2 Sheets-Sheet 1
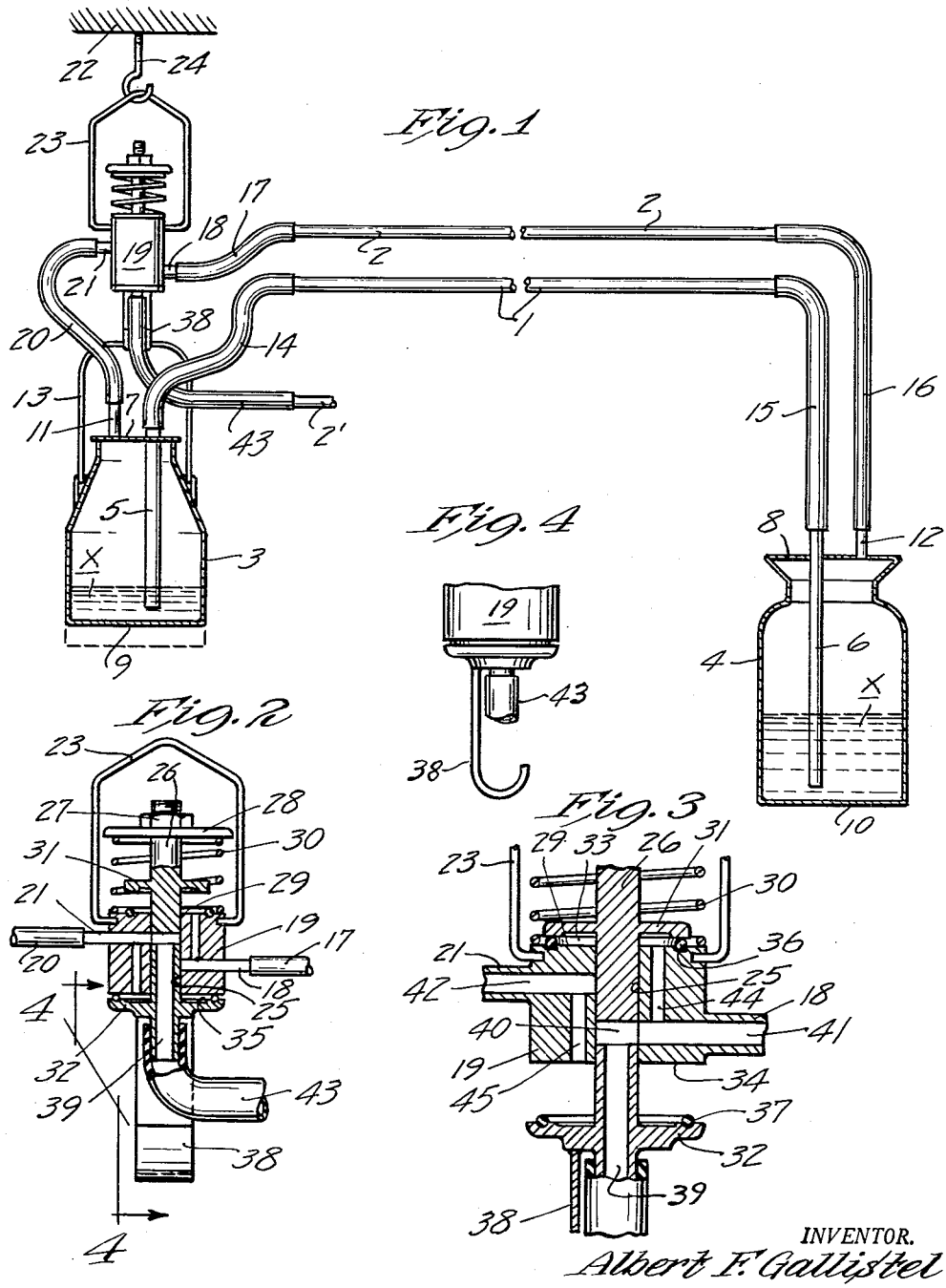
INVENTOR.
Albert F. Gallistel
BY
Merchant & Merchant
ATTORNEYS

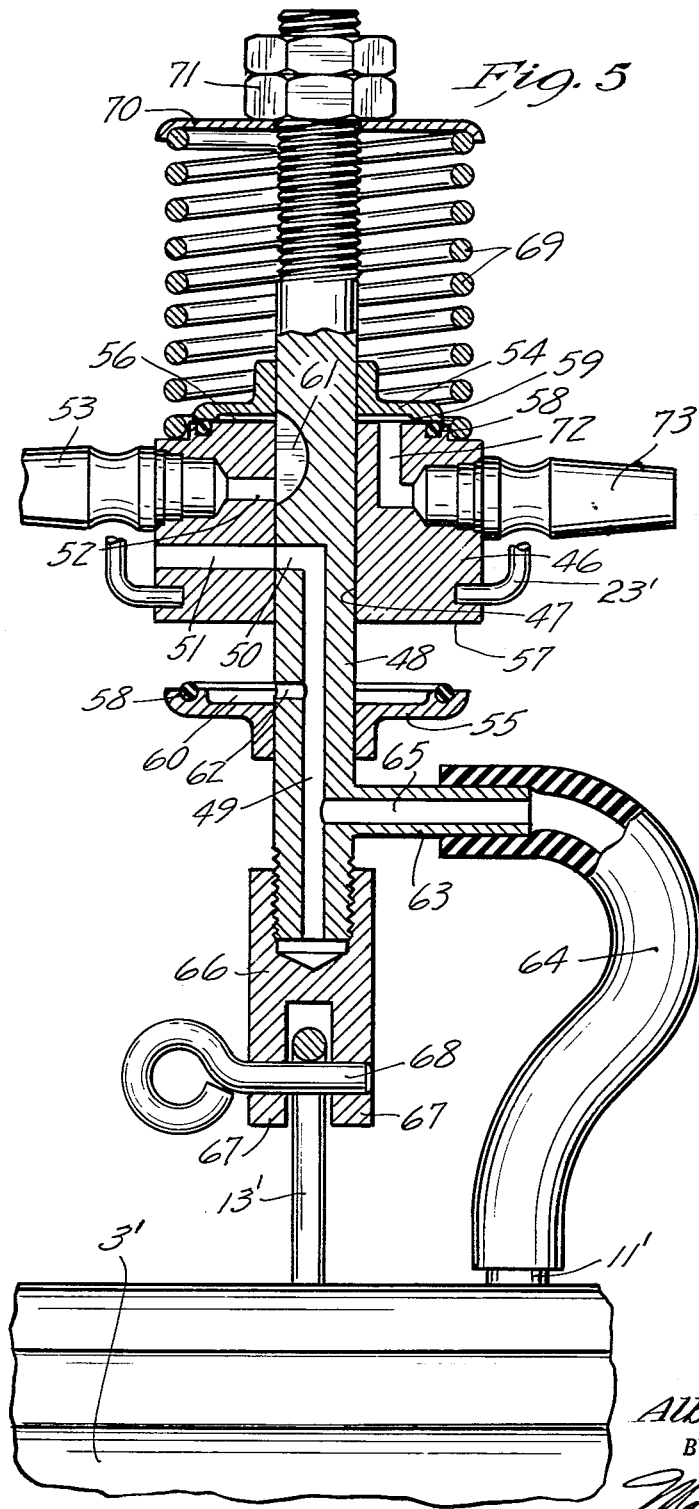

United States Patent Office 2,713,344
Patented July 19, 1955

2,713,344

FLUSHING SYSTEM FOR VACUUM FLUID LINES AND VALVE THEREFOR

Albert F. Gallistel, Minneapolis, Minn., assignor to Perfection Manufacturing Corporation, Minneapolis, Minn., a corporation of Minnesota Application August 11, 1954, Serial No. 449,180

18 Claims. (Cl. 134—56)

My invention provides a vacuum operated pipe line washer and is particularly adaptable to the flushing of the milk pipes in a sanitary milk line system.

The primary object of my invention is the provision of novel reversing valve mechanism which may be readily interposed in the vacuum line of said system, and which, when containers (either one of which contains a flushing fluid) are secured to opposite ends of said milk and vacuum lines, will cause said fluid to automatically pass from one container to the other, through said milk line, until the flushing operation is complete.

A still further and highly important object of my invention is the provision of novel means which prevent partial operation of the reversing valve mechanism before a desired and predetermined amount of fluid from a given bucket to another bucket has been caused to pass through the milk line at a given high velocity.

A still further object of my invention is the provision of means of the type immediately above described wherein the vacuum utilized to impart velocity to the flushing fluid is also utilized to prevent actuation of the reversing valve until a desired amount of fluid has been caused to pass through the milk line.

A still further object of my invention is the provision of a device of the class described which is inexpensive to produce, which is foolproof in operation—having a minimum of working parts, which is easy to maintain, and which is durable in use.

The above and still further objects of my invention will become apparent from the following detailed specification, appended claims, and attached drawings.

Referring to the drawings, wherein like characters indicate like parts throughout the several views:

Fig. 1 is a schematic view partly in side elevation and partly in vertical section of my novel structure in operative position on a conventional pulsator pipe and milk line, some parts being broken away;

Fig. 2 is an enlarged fragmentary view in axial section of my reversing valve mechanism;

Fig. 3 is a still further enlarged fragmentary view corresponding to a portion of Fig. 2 but showing a different position of some of the parts;

Fig. 4 is a fragmentary detail in side elevation as seen from the line 4—4 of Fig. 2; and Fig. 5 is a greatly enlarged fragmentary view partly in side elevation and partly in axial section of a modified form of the invention.

In the milking of a relatively large number of cows, the customary procedure is to provide a pipe line running adjacent a plurality of stalls and leading to a tank or other repository. Suitable cocks or valves are interposed in the pipe line so that lines from milking machines may be attached thereto and the milk transferred directly to the pipe line from the milking machines. In the interests of sanitation, it is essential the milk line or conduit be thoroughly cleaned after each milking session with suitable detergent or germicidal solution. The instant invention provides relatively simple means whereby such liquid may be run through the entire pipe line with a minimum of time and effort involved and for as many times as is necessary to thoroughly flush and cleanse the line and without loss of the flushing liquid.

In the preferred embodiment of the invention illustrated in Figs. 1 to 4 inclusive, a milk conduit or pipe line of the type above referred to is shown diagrammatically and indicated at 1, a vacuum conduit or pipe used in connection with the milking machines being shown at 2. The afore-mentioned stall cocks or valves not comprising any portion of the instant invention, are not shown.

Apparatus for cleaning and flushing the pipe line 1 comprises a pair of air-tight containers 3 and 4 each provided with a fluid pipe 5 and 6 respectively which terminate above their respective container covers 7 and 8 and which extend downwardly into their respective containers 3 and 4, terminating at their lower ends in closely spaced relation to the bottom walls 9 and 10 of their respective containers 3 and 4. The containers 3 and 4 are further provided with air outlet tubes 11 and 12 respectively that communicate with the interiors of the containers through their respective covers 7 and 8. The containers 3 and 4 are each preferably of a size to contain a substantially greater amount of flushing liquid, indicated at X, than is required to completely fill the fluid pipe line 1. Preferably the container 3, is provided with a bail or handle 13 by means of which the container 3 may be suspended for a purpose which will hereinafter be described. The upper projecting ends of the fluid pipes 5 and 6 are adapted to be connected each to an opposite end of the fluid pipe line 1 by means of respective flexible tubes 14 and 15, see Fig. 1, for the purpose of transferring the flushing liquid X from one container to the other through the pipe line 1. Likewise, a flexible tube 16 is connected at one end to the air outlet tube 12 of the container 4 and at its other end to the vacuum pipe 2. In setting up the apparatus of the instant invention for cleaning the pipe line 1, the vacuum line 2 is disconnected from the source of vacuum, not shown, and a length of flexible tube 17 is connected at one end to the vacuum pipe 2 the other end of the tube 17 being connected to a spud or fitting 18 on a valve body 19. The valve body 19 comprises a portion of reversing valve mechanism which controls the flow of liquid X from one of the containers to the other. A second flexible tube 20 is secured at one end to a second spud or fitting 21 extending laterally outwardly from the valve body 19, and at its other end to the air outlet tube 11 of the container 3. The valve body 19 is preferably suspended from a beam or other supporting means 22 by means of an inverted generally U-shaped bail or the like 23 and a cooperating hook 24 which is screw threaded or otherwise rigidly secured to the supporting member 22.

The valve body 19 is formed to provide a central bore 25 which extends vertically therethrough and in which is longitudinally slidably mounted an elongated valve core 26. The valve core 26, at its upper end, is screw threaded to receive an adjustment nut 27 which overlies an abutment member in the nature of a washer or the like 28 between which and the upper end surface 29 of the valve body 19 is interposed yielding means in the nature of a coil compression spring 30 which biases the valve core 26 in an upward direction. The valve core 26 is formed to provide a pair of upper and lower annular disc or cup-shaped flanges 31 and 32 respectively the former of which cooperates with the upper end wall surface 29 to provide a vacuum chamber 33 under reciprocatory movement of the valve core 26 to its limit of downward movement as indicated in Fig. 3. The flange 32 likewise cooperates with the lower end wall surface 34 of the valve body 19 to provide a vacuum chamber 35 when the valve core 26 is moved to its upper limit of reciprocatory movement as indicated in Figs. 1, 2, and 4. Rubber-like sealing rings 36 and 37 aid in the effective sealing of the chambers 33 and 35 respectively. The lower end portion of the valve core 26 below the flange 32 is provided with container-supporting means in the nature of a depending hook 38 which is adapted to receive the bail 13 of the container 3.

The core 26 definees an internal passage 39 which extends axially upwardly from the lower end of the core 26 and terminates at its upper end in a transverse port 40 which is adapted to register with each of a pair of passages 41 and 42 in the valve body 19. The passages 41 and 42 are spaced longitudinally of the direction of reciprocatory movement of the core 26, the former thereof extending outwardly through the spud 18 and the latter of which extends outwardly through the spud 21. With reference to Figs. 2 and 3, it will be seen that when the valve core 26 is in its uppermost position to close the vacuum chamber 35, the port 40 is in registration with the air passage 42, and that when said valve core 26 is in its lowermost position of reciprocatory movement to close the vacuum chamber 33, the port 40 is in registration with the air passage 41. The passage 39 in the valve core 26 is adapted to be connected to a source of vacuum, such as a vacuum pump, not shown, by means of an extension 2' of the vacuum line 2 and a section of flexible tubing 43 one end of which is connected to the vacuum line extension 2' and the other end of which is connected to the lower end of the valve core 26. It should be noted that during the normal operation of the pipe line 1 and the vacuum line 2 during the milking operation, the flexible tube 43 is preferably connected between the vacuum line 2 and the vacuum line extension 2', and that when it is desired to flush the system, said tube 43 is disconnected from the vacuum line 2 and connected to the lower end of the passage 39 in the valve core 26, the flexible tube 17 being connected to the adjacent end of the vacuum line 2. The valve body 19 further defines passage means in the nature of branch passages 44 and 45 the former of which extends from the air passage 41 through the end wall 29 of the body 19 so as to communicate with the chamber 33 and cause said chamber to be subject to vacuum when the port 40 is in registration with the air passage 41. The branch passage 45 extends downwardly from the air passage 42 through the end wall 34 of the valve body 19 so as to communicate with the vacuum chamber 35 when the same is closed to cause said chamber to be subject to vacuum when the port 40 is in registration with the air passage 42. Use of the term vacuum in these instances is not intended to define a total absence of air pressure, but is merely intended to indicate subatmospheric pressure of a predetermined amount, hence the term vacuum is used merely for convenience.

*Operation of structure of Figs. 1 to 4 inclusive*

When it is desired to flush the milk pipe line 1 after the milking operation has been completed and the milk drawn out of said pipe line, the flexible tube 43 is disconnected from the vacuum line 2 and connected to the lower end of the valve core 26, the valve mechanism having been suspended from the hook 24 by means of its bail 23. The flexible tube 17 is then connected to the adjacent end of the vacuum pipe 2. The container 3 is then suspended from the hook element 38 and the flexible tube 20 connected between the outlet tube 11 and the spud 21, the tube 14 being connected to the upper end of the fluid pipe 5 and the adjacent end of the pipe line 1. The coil compression spring 30 is of sufficient strength in itself to support the empty weight of the container 3 and maintain the flange 32 in chamber-defining relationship with the lower end wall 34 of the valve body 19. As above indicated, in this position of the valve core 26, the port 40 is in registration with the air passage 42. The container 4, which may be assumed to be substantially filled with the flushing liquid X, is placed on the floor or other suitable supporting means adjacent the opposite end of the pipe line 1 and the adjacent end of the vacuum line 2, the flexible tubes 15 and 16 being connected to said ends of the pipe line 1 and vacuum line 2 respectively.

The container 3 being empty and the valve core 26 being positioned as indicated in Figs. 1, 2 and 4, energization of the vacuum source, not shown, will cause a partial vacuum to exist in the closed chamber 35 and in the interior of the air-tight container 3. As the vacuum increases in the container 3, the fluid X will be drawn from the container 4 to the container 3 through the pipe line 1, flexible tubes 14 and 15 and the fluid pipes 5 and 6. At the same time, air is drawn into the container 4 through the tubes 12, 16, 2 and 17 and the passages 41 and 44. The fluid X continues to flow from the container 4 to the container 3 until the level of the fluid X in the tank 4 reaches the bottom of the fluid pipe 6 therein. During the filling of the container 3 with the liquid X, the weight thereof exerts an increasing downward pressure on the valve core 26 against the bias of the spring 30. In accordance with the instant invention, the spring 30 of itself is not sufficiently strong to support the filled weight of the container 3. However, the combined bias of the spring 30 and the partial vacuum existing in the closed chamber 35 are sufficient to hold the chamber 5 in a sealed closed condition against the operatively filled weight of the container 3. When the level of the liquid X reaches the lower end of the fluid pipe 6, air will be drawn upwardly therethrough and through the pipe line 1, and when the air in the pipe line 1 reaches the interior of the container 3 and flows upwardly through the flexible tube 20 into the valve body 19, the partial vacuum in the closed chamber 35 will be reduced sufficiently to permit downward movement of the valve core 26 and consequent opening of the chamber 35. The weight of the filled container 3 will move the valve core 26 downwardly until the flange 31 moves into operative engagement with the upper end wall surface 29 of the valve body 11 to make sealing contact therewith through the medium of the sealing ring 36, see Fig. 3. At this point the port 40 will be in registration with the air passage 41 whereupon the interior of the container 4 and the vacuum chamber 33 will be immediately subject to the vacuum source and reverse flow of the liquid X through the pipe line 1 initiated. As the liquid X flows from the container 3 through the pipe line 1 to the container 4, the combined weight of the container 3 and liquid therein decreases until the bias of the spring 30 is sufficient to raise the same. However, the vacuum in the closed chamber 31 is sufficient to hold the valve core 26 in its lowermost position of reciprocatory movement until the level of the liquid X in the container 3 falls below the lower end of the fluid pipe 5 and air replaces the liquid in the pipe line 1. Thus, when the pipe line 1, the tube 15 and fluid pipe 6 are empty of liquid and air enters the vacuum line 2 from the container 4, the vacuum is reduced sufficiently in the chamber 31 to permit the spring 30 to raise the valve core 26 to its position of Fig. 2 thereby automatically causing reversal of vacuum and liquid flow. This reversal cycle may be repeated as many times as is necessary to completely flush and clean the entire pipe line. If desired, other containers similar to the containers 3 and 4 using rinsing fluid may be applied to the pipe line 1 after the detergent liquid X has completed its function, or if desired, rinsing water may be run through the pipe line 1 by any suitable method.

In the modified form of the invention illustrated in Fig. 5, a valve body is indicated at 46 and is provided with an axial bore 47 which slidably receives an elongated valve core 48 having a longitudinally extending passage 49 therein. The upper end of the passage 49 terminates in a port 50 that is selectively registrable with a pair of air passages 51 and 52 that are spaced apart longitudinally of the direction of reciprocatory movement of the valve core 48. Preferably, and as shown, the air passage 51 opens to atmosphere at one side of the valve body 11, and the air passage 52 is adapted to be connected to a source of vacuum, not shown, through the medium of a spud or fitting 53 and suitable conduit means also not shown. The valve core 48 is provided with a pair of annular flanges 54 and 55 that are operatively engageable with opposite end wall surfaces 56 and 57 respectively of the valve body 46 upon reciprocatory movement of the valve core 48 in opposite directions. Sealing rings 58 insure an airtight seal between the flanges 54 and 55 and their respective wall surfaces 56 and 57. The flange 54 and the end wall surface 56 of the valve body 46 when in operative engagement, define a vacuum chamber 59, whereas the flange 55 and the end wall surface 57 of the valve body 46, when in operative engagement, define a vacuum chamber 60. The valve core 48 is further formed to provide passage means in the nature of a relatively short air passage 61 which, when the valve core 48 is in its lowermost position, connects the air passage 52 with the vacuum chamber 59. Said passage means further includes a branch passage 62 extending transversely outwardly from the passage 49 in the valve core 48 to the vacuum chamber 60. Adjacent its lower end, the valve core 48 is formed to provide a spud or nipple 63 to which is connected a flexible tube 64 which at its other end is connected to the air tube 11' of an air-tight fluid liquid container 3' identical to the container 3 of the structure illustrated in Fig. 1. The tube 64 communicates with the passage 49 in the valve core 48 by an air passage 65 extending through the nipple 63. The container 3' is provided with a bail 13' by means of which the container 3' may be suspended from a clevis 66 screw threaded or otherwise rigidly secured to the lower end of the reciprocatory valve core 48. As shown, the clevis includes a pair of spaced depending lugs 67 between which the bail 13' is received and through which extends a bail-supporting pin or the like 68. A coil compression spring 69 is interposed between the body 46 and an abutment member in the nature of a washer 70 which underlies an adjustment nut 71 screw threaded on the threaded upper end portion of the valve core 48. Like the spring 30 in the structure of Figs. 1 to 4 inclusive, the spring 69 may be made to exert greater or lesser yielding bias against the abutment member 70 by adjustment of the nut 71 to compensate for varying degrees of vacuum in the closed chambers and varying weights of containers 3 or 3'. The valve body 46 further defines an air passage 72 which extends from the upper closure defining wall surface 56 of the valve body and terminates in communication with a nipple or fitting 73 which is adapted to be connected to the vacuum line in the same manner as is the spud 18 on the valve body 19. A bail or the like 23' for suspending the valve body 46 is shown fragmentarily in Fig. 5 and may be assumed to be identical to the bail 23 of Figs. 1, 2 and 3. The valve mechanism of Fig. 5 operates in the same manner as does the valve mechanism of the preferred form illustrated in Figs. 1 to 4 inclusive. A partial vacuum is obtained in the closed chamber 59 by application of the source of vacuum to the nipple or fitting 53 which in the position of the parts shown in Fig. 5, evacuates air from the container at the opposite end of the pipe line, not shown, through the fitting 73, the air passage 72, the vacuum chamber 59, the passage 61 in the valve core 48 and the air passage 52. When the container, not shown, is relatively full and the container 3' is relatively empty, emptying of the liquid pipe line, not shown, will reduce the vacuum in the closed chamber 59 and permit the spring 69 to raise the operatively empty container 3' and the valve core 48 into operative engagement of the flange 55 with the lower end wall surface 57 of the valve body 46. In this position of the valve core 48, the port 50 will be in registration with the air passage 52 and the interior of the container 3' will be in communication with the source of vacuum through the flexible tube 64, the passages 65 and 49 in the valve core 48. Air is also evacuated from the now closed chamber 60 through the transverse passage 62 in the valve core 48. From the above it should be obvious that the valve mechanism of Fig. 5 will operate in identically the same manner as the valve structure of Figs. 1 to 4 inclusive to cause the flushing liquid to flow successively in opposite directions through the liquid pipe line.

My invention has been thoroughly tested and found to be completely satisfactory for the accomplishment of the objectives set forth; and while I have shown and described a preferred embodiment and a single modified form of my flushing system and reversing valve mechanism therefor, it will be understood that the same is capable of further modification without departure from the spirit and scope of the invention as defined in the claims.

What I claim is:

1. Reversing valve mechanism for a fluid line adapted to be connected to a pair of spaced fluid containers, at least one of said containers being air-tight and having a vacuum line leading therefrom, said mechanism comprising a valve body element and a valve core element mounted for reciprocatory sliding movements with respect to said body element, said body element defining a pair of air passages spaced apart longitudinally of the direction of movement of said valve core element, said valve core element having a passage therein registrable selectively with said passages in said body element upon reciprocation of said valve core element, yielding means uring one of said elements in one direction of reciprocatory movement, means on one of said elements cooperating with said yielding means to support one of said containers, means on said valve core element cooperating selectively with spaced portions of said body element to define vacuum chambers, said valve mechanism defining passage means selectively connecting said vacuum line to said spaced vacuum chamber defining portions responsive to relative movement between said valve body and said valve core element in opposite directions, said yielding means being sufficient to overcome the operatively empty weight of the container supported by said valve mechanism to close one of said vacuum chambers, the combined bias of said yielding means and the vacuum produced in said closed chamber when the fluid line is filled being sufficient to support the operatively filled weight of the container supported by the valve mechanism, but inadequate to support said filled container when the vacuum in said chamber is reduced due to emptying of said fluid line.

2. The structure defined in claim 1 in which the means on the valve core element defining said vacuum chambers comprise opposed annular flanges rigidly carried thereby and which make sealing contact with cooperating surface portions on opposite sides of said valve body radially outwardly of said passage means.

3. The structure defined in claim 1 in further combination with means for adjusting the bias exerted by said yielding means with respect to the vacuum within said chambers.

4. The structure defined in claim 3 in which said yielding means is in the nature of a coil compression spring interposed between one end of said valve core element and said valve body element concentrically of said valve core element and one of said flanges.

5. The structure defined in claim 1 in which the container is supported by the valve core element, and in further combination with means for mounting said valve body element with respect to a supporting means.

6. In a cleaning system for milk pipe lines and including a pair of air-tight containers adapted to be connected to opposite ends of said pipe line and being further connected y a vacuum line, reversing valve mechanism interposed in said vacuum line between said containers, said reversing valve mechanism comprising a valve body element and a valve core element mounted for reciprocatory sliding movements with respect to said valve body element, said body element defining a pair of air passages spaced apart longitudinally of the direction of movement of said valve core element, said valve core element having a passage therein registrable selectively with said passages in said body element upon reciprocation of said valve core element, yielding means urging one of said elements in one direction of reciprocatory movement, means on one of said elements cooperating with said yielding means to support one of said containers, means on said valve core element cooperating selectively with spaced portions of said valve body element to define vacuum chambers, said valve mechanism defining passage means selectively connecting said vacuum line to said spaced vacuum chamber defining portions responsive to relative movement between said valve body element and said valve core element in opposite directions, said yielding means being sufficient to overcome the operatively empty weight of the container supported by said valve mechanism to close one of said vacuum chambers, the combined bias of said yielding means and the vacuum produced in said closed chamber when the fluid line is filled being sufficient to support the operatively filled weight of the container supported by the valve mechanism, but inadequate to support said filled container when the vacuum in said chamber is reduced due to emptying of said fluid line, whereby to permit relative movement between said elements to cause opening of said closed chamber and closing of the other chamber.

7. The structure defined in claim 6 in which the container supporting means comprises a supporting member on the lower end portion of said valve core element, said container having handle means adapted to be detachably secured to said handle member.

8. The structure defined in claim 6 in which said vacuum chamber defining means comprises opposite end wall surfaces of said body element and a pair of longitudinally spaced cup-like flanges on said core element, each of said flanges operatively engaging an adjacent end wall surface of said body element upon reciprocatory movement of said core element in opposite directions to alternately provide one of said chambers, and in further combination with means for providing an air-tight seal between said flanges and said end wall surfaces radially outwardly of said passage means.

9. Reversing valve mechanism for a fluid line adapted to be connected to a pair of spaced air-tight fluid containers, said valve mechanism being interposed in a vacuum line between said containers, said mechanism comprising a valve body element and a valve core element mounted for reciprocatory sliding movements with respect to said body element, said body element defining a pair of air passages spaced apart longitudinally of the direction of movement of said valve core element, each of said air passages communicating with portions of said vacuum line leading to opposite ones of said containers, said valve core element having a passage therein one end of which is registrable selectively with said passages in the body element upon reciprocation of said valve core element, the other end of the passage in said valve core element being adapted to be connected to a source of vacuum, yielding means urging one of said elements in one direction of reciprocatory movement, means on one of said elements cooperating with said yielding means to support one of said containers, and means on said valve core element cooperating selectively with spaced portions of said body element to define vacuum chambers, said valve body element defining passage means connecting each of the spaced passages in said body element with a different one of said vacuum chambers, said yielding means being sufficient to overcome the operatively empty weight of the container supported by said valve mechanism to close one of said vacuum chambers, the combined bias of said yielding means and the vacuum produced in said closed chamber when the fluid line is filled being sufficient to support the operatively filled weight of the container supported by the valve mechanism but inadequate to support said filled container when the vacuum in said chamber is reduced due to emptying of said fluid line, whereby to permit relative movement between said elements to cause opening of said closed chamber and closing of the other chamber.

10. The structure defined in claim 9 in further combination with means for adjusting the bias exerted by the yielding means with respect to the vacuum within said chambers.

11. Reversing valve mechanism for a fluid line adapted to be connected to a pair of spaced air-tight fluid containers, said valve mechanism being interposed in a vacuum line between said containers, said mechanism comprising a valve body having a vertical bore therein, means for mounting said body to a support, a valve core mounted for longitudinal reciprocatory sliding movements in said bore, said valve body defining a pair of air passages communicating with said bore in spaced relation longitudinally of the direction of movement of said valve core, each of said air passages communicating with portions of said vacuum line leading to opposite ones of said containers, said valve core having a passage therein one end of which is registrable selectively with said passages in the body upon reciprocation of said valve core, the other end of the passage in said valve core being adapted to be connected to a source of vacuum, yielding means urging said valve core in an upward direction, means on said valve core cooperating with said yielding means to support one of said containers, and means on said valve core cooperating selectively with spaced portions of said body to define vacuum chambers, said valve body defining passage means connecting each of the spaced passages in the body with a different one of said vacuum chambers, said yielding means being sufficient to overcome the operatively empty weight of the container supported by the valve mechanism to close one of said vacuum chambers when the fluid line between said containers is empty, the combined bias of said yielding means and the vacuum produced in said closed chamber when the fluid line is filled being sufficient to support the operatively filled weight of the container supported by the valve mechanism but inadequate to support said filled container when the vacuum in said chamber is reduced due to emptying of said fluid line, whereby to permit relative movement between said elements to cause opening of said closed chamber and closing of the other chamber.

12. The structure defined in claim 11 in which said vacuum chamber defining means on the valve core comprises a pair of opposed annular flanges on said valve core longitudinally outwardly of the opposite ends of said valve body and operatively engageable with said ends upon reciprocatory movement of the valve core in opposite directions to define said chambers, said passage means comprising a pair of branch passages each connecting a different one of the air passages in said body with a different one of said vacuum chambers.

13. The structure defined in claim 11 in which said yielding means comprises a coil compression spring and in further combination with an abutment member mounted on the upper end portion of said valve core, said spring being interposed between said abutment member and the adjacent end of the valve body concentric with said valve core, and means on the valve core for adjusting the position of said abutment member longitudinally of the valve core whereby to vary the bias exerted by the yielding means with respect to the vacuum in said chambers.

14. The structure defined in claim 11 in which said valve core extends through said valve body, and in which the means for supporting one of said containers includes a hook element on the lower end portion of said valve core engageable with a handle on said one of the containers.

15. In a cleaning system for milk pipe lines and including a pair of air-tight containers adapted to be connected to opposite ends of said pipe line and being further connected by a vacuum line, reversing valve mechanism interposed in said vacuum line between said containers, said reversing valve mechanism comprising a valve body element having a bore therethrough and a valve core element mounted for reciprocatory sliding movements in said bore, said body element defining a pair of air passages communicating with said bore in spaced relationship longitudinally of the direction of movement of said valve core element, said valve core element having a passage therein, one end of the passage in said valve core element being registrable selectively with said passages in the body element upon reciprocation of said valve core element, the passage in said valve element providing a portion of said vacuum line communicating with one of said containers, one of said passages in the body element being open to atmosphere and the other thereof being adapted to be connected to a source of vacuum, yielding means urging one of said elements in one direction of reciprocatory movement, means on one of said elements cooperating with said yielding means to support one of said containers, means on said valve core element cooperating selectively with spaced portions of said valve body element to define a pair of vacuum chambers, said valve mechanism defining passage means connecting said vacuum line alternately to said spaced vacuum chamber defining portions responsive to relative movement between said valve body element and said valve core element in opposite directions, said passage means including a passage in said valve body communicating with the other of said containers, said yielding means being sufficient to overcome the operatively empty weight of the container supported by said valve mechanism to close one of said vacuum chambers, the combined bias of said yielding means and the vacuum produced in said closed chamber when the fluid line is filled being sufficient to support the operatively filled weight of the container supported by the valve mechanism, but inadequate to support said filled container when the vacuum in said chamber is reduced due to emptying of said fluid line, whereby to permit relative movement between said elements to cause opening of said closed chamber and closing of the other chamber.

16. The structure defined in claim 15 in which said passage means further includes a pair of longitudinally spaced passages in said valve core element, one of said passages connecting the first-mentioned passage in the valve core element to one of said vacuum chambers and the other thereof connecting the vacuum source connected passage in said valve body element to the other of said vacuum chambers upon movements of the valve core element to its opposite vacuum chamber-forming positions.

17. The structure defined in claim 15 in which said means for supporting one of the containers comprises a clevis on the lower end of the valve core element, said clevis being detachably engageable with a handle on said one of the containers.

18. The structure defined in claim 17 in which said valve core element is provided at its upper end with a head-forming member longitudinally adjustable thereon, said yielding means comprising a coil compression spring interposed between said adjustable member and the adjacent end of said valve body element concentric to the valve core element and the adjacent one of said vacuum chamber defining means on said valve core element.

No references cited.